(12) United States Patent
Palmer et al.

(10) Patent No.: US 8,614,788 B2
(45) Date of Patent: Dec. 24, 2013

(54) OPHTHALMIC LENS SCANNER (75) Inventors: Richard C. Palmer, Minneapolis, MN (US); Spencer Daniel Luster, Toledo, OH (US); Keith Alan Flick, Sylvania, OH (US); James G. Goerges, Brainerd, MN (US); Jacob M. Schneider, Little Falls, MN (US)

(73) Assignee: Practical Engineering, LLC, Minneapolis, MN (US)

( * ) Notice: Subject to any disclaimer, the term of this patent is extended or adjusted under 35 U.S.C. 154(b) by 556 days.

(21) Appl. No.: 12/939,643

(22) Filed: Nov. 4, 2010

(65) Prior Publication Data

US 2011/0102775 A1 May 5, 2011

Related U.S. Application Data

(60) Provisional application No. 61/258,029, filed on Nov. 4, 2009.

(51) Int. Cl.
*G01B 9/00* (2006.01)
*G01N 21/00* (2006.01)
*F16C 33/74* (2006.01)

(52) U.S. Cl.
USPC .................. 356/124; 356/239.2; 382/141

(58) Field of Classification Search
USPC .............. 356/124, 239.2, 239.1; 382/141
See application file for complete search history.

(56) References Cited

U.S. PATENT DOCUMENTS

| 4,641,964 A | * | 2/1987 | Mitani et al. ............... 356/125 |
| 5,428,448 A | | 6/1995 | Albert-Garcia |
| 5,521,656 A | | 5/1996 | Portney |
| 5,627,638 A | * | 5/1997 | Vokhmin .................... 356/124 |
| 5,661,816 A | * | 8/1997 | Fantone et al. ............. 382/100 |
| 2004/0008877 A1 | * | 1/2004 | Leppard et al. ............ 382/141 |
| 2007/0273870 A1 | * | 11/2007 | Divo ............................ 356/124 |
| 2008/0144186 A1 | * | 6/2008 | Feng et al. .................. 359/666 |

FOREIGN PATENT DOCUMENTS

| JP | 56093002 A | 7/1981 |
| JP | 58161806 A | 9/1983 |

OTHER PUBLICATIONS

Abstract of JP58161806, 1983.
Abstract of JP56093002, 1981.
PCT International Search Report, Jul. 12, 2011.
PCT Written Opinion, Jul. 12, 2011.

* cited by examiner

*Primary Examiner* — Roy M Punnoose
*Assistant Examiner* — Sunghee Y Gray
(74) *Attorney, Agent, or Firm* — Westman, Champlin & Koehler, P.A.; Z. Peter Sawicki (57) ABSTRACT

An ophthalmic lens scanner includes an inspection platform configured to receive an ophthalmic lens thereon. A camera is spaced apart from the inspection platform and is arranged to, in response to an activation signal, capture an image of the ophthalmic lens. A light source is spaced apart from the inspection platform and is configured to emit light when the camera is activated to capture an image of the ophthalmic lens. The inspection platform is located between the camera and the light source. A first Fresnel lens is located between the inspection platform and the camera. A second Fresnel lens is located between the inspection platform and the light source. The ophthalmic lens scanner may be incorporated in an ophthalmic lens scanner system that includes a computing device and a display device.

20 Claims, 9 Drawing Sheets

OPHTHALMIC LENS SCANNER

CROSS-REFERENCE TO RELATED APPLICATION

The present application is based on and claims the benefit of U.S. provisional patent application Ser. No. 61/258,029, filed Nov. 4, 2009, the content of which is hereby incorporated by reference in its entirety.

TECHNICAL BACKGROUND

The disclosure relates generally to the manufacture of optical lenses.

BACKGROUND

In the prescription optical industry, retail ophthalmic dispensers and wholesale production ophthalmic laboratories encounter a number of issues in manufacturing prescription eyeglasses. One issue, for example, is inconvenience to eyewear patients. Lenses are cut to fit each frame. When an eyewear patient is in need of a change in prescription lens powers and wishes to use his or her existing eyewear frame instead of purchasing a complete pair of eyeglasses, the patient must generally surrender his or her frame to the retail optical dispenser so that it can be shipped to the optical laboratory for lens fitting. Because most patients do not have a second pair of functioning eyeglasses, they are often without eyeglasses for the duration of the manufacturing process. For many patients, this scenario is at least inconvenient, if not intolerable, particularly for patients who use strong prescription lens powers.

In order for the production laboratory to accurately fabricate prescription lenses to the exact size, shape, and dimensions required to fit a patient's frame, it is necessary to ship the patient's frame to the laboratory. Because the patient's frame must be shipped to the laboratory and then shipped back to the retail ophthalmic dispenser once lens fabrication is complete, the service and delivery time for new prescription lenses ordered on behalf of the patient can often consume five or more work days.

Some retail ophthalmic dispensers have attempted to address this issue by purchasing devices known in the industry as frame tracers at considerable expense. Frame tracers employed in the industry today are mechanical devices that require regularly scheduled and detailed calibration by the retail ophthalmic dispenser. Preferably, frame tracers are calibrated daily. A properly calibrated frame tracer can obtain sufficient lens geometry data to forward to the production facility. However, calibration is often not performed as a matter of in-office routine, and even when calibration is performed regularly, it is not performed correctly. As a result, the lens geometry data that is obtained by improperly calibrated frame tracers can be substantially inaccurate.

Another issue that stems from the need to ship the patient's frame to the laboratory is one of costs and initiation of unproductive labor activity within the laboratory. Even though the Internet has facilitated sending patients' prescription lens power requirements to a fabricating laboratory, certain prescription complexities may make it difficult or impossible to begin production of new lenses until a patient's frame arrives from the retail ophthalmic dispenser. This issue creates what laboratory personnel refer to as a prescription with a "frame-to-follow."

Once a patient's frame arrives in the laboratory, it is necessary for laboratory personnel to locate the specific prescription work order that corresponds to the frame, match the frame and the work order for production, and perform a frame trace on the frame. Once the frame has been traced, an updated and completed work ticket is produced. Experience in managing and working in a production facility has shown that this matching of a received frame and an initial job work ticket can prove to be costly and time consuming, especially considering that the average production volume of a laboratory is in excess of 400 work orders per day.

SUMMARY OF THE DISCLOSURE

According to principles disclosed herein, an ophthalmic lens scanner includes an inspection platform configured to receive an ophthalmic lens thereon. A camera is spaced apart from the inspection platform and is arranged to, in response to an activation signal, capture an image of the ophthalmic lens. A light source is spaced apart from the inspection platform and is configured to emit light when the camera is activated to capture an image of the ophthalmic lens. The inspection platform is located between the camera and the light source. A first Fresnel lens is located between the inspection platform and the camera. A second Fresnel lens is located between the inspection platform and the light source. The ophthalmic lens scanner may be incorporated in an ophthalmic lens scanner system that includes a computing device and a display device.

Certain advantages may be realized. For instance, a retail ophthalmic dispenser can scan a patient's old lenses and transmit accurate size, shape, and dimensional geometry to the laboratory, for example, via the Internet. When the laboratory receives the lens specifications, work can immediately begin due to the accuracy of the data provided. As a result, completed prescription lenses can be shipped back to the retail ophthalmic dispenser more quickly compared with conventional techniques. In addition, patients are not required to surrender their frames to the retail ophthalmic dispenser for shipment to the fabricating laboratory.

Additional objects, advantages, and features will become apparent from the following description and the claims that follow, considered in conjunction with the accompanying drawings.

DETAILED DESCRIPTION

An ophthalmic lens scanner includes an inspection platform configured to receive an ophthalmic lens thereon. A camera is spaced apart from the inspection platform and is arranged to, in response to an activation signal, capture an image of the ophthalmic lens. A light source is spaced apart from the inspection platform and is configured to emit light when the camera is activated to capture an image of the ophthalmic lens. The inspection platform is located between the camera and the light source. A first Fresnel lens is located between the inspection platform and the camera. A second Fresnel lens is located between the inspection platform and the light source. The ophthalmic lens scanner may be incorporated in an ophthalmic lens scanner system that includes a computing device and a display device.

The following description is to be construed by way of illustration rather than limitation. This description is not intended to limit the scope of the disclosure or the applications or uses of the subject matter disclosed in this specification. For example, while various embodiments are described as being implemented in the context of fabricating ophthalmic lenses, it will be appreciated that the principles of the disclosure are applicable to other environments.

In the following description, numerous specific details are set forth in order to provide a thorough understanding of the principles disclosed herein. It will be apparent to one skilled in the art that these principles may be practiced without some or all of these specific details. In other instances, well known components and process steps have not been described in detail.

Some portions of this disclosure may be provided in the general context of processor-executable instructions, such as program modules, being executed by a processor. Generally, program modules include routines, programs, objects, components, data structures, etc., that perform particular tasks or implement particular abstract data types. A distributed processing environment may be employed in which tasks are performed by remote processing devices that are linked through a communications network or other data transmission medium. In a distributed processing environment, program modules and other data may be located in both local and remote storage media, including memory storage devices.

Figure 1:
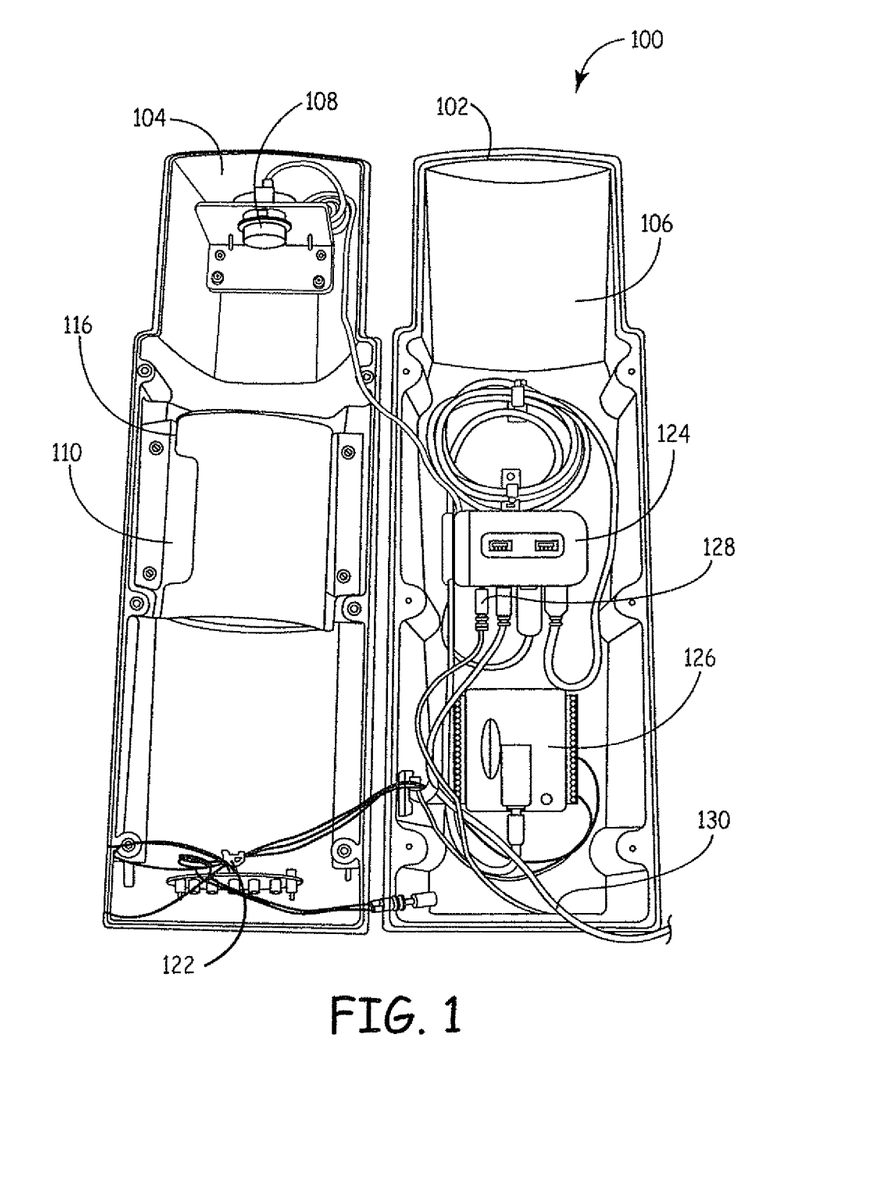
FIG. 1 is a partially disassembled view of an example ophthalmic lens scanner.

Referring now to the drawings, FIG. 1 illustrates an example ophthalmic lens scanner 100. The ophthalmic lens scanner 100 includes a case assembly 102 formed by a front case portion 104 and a rear case portion 106. The front case portion 104 and the rear case portion 106, as well as a door, may be formed by a Reaction Injection Molding (RIM) process, using silicone molds, from a resin known within the molding industry as Resin UL94V-0 and formed to a nominal wall thickness of approximately 0.125 inch (3.175 mm). The front case portion 104, the rear case portion 106, and the door may be painted on inner and outer surfaces with surface texturing on the outer surfaces. The front case portion 104 and the rear case portion 106 may be approximately 19 inches (482.6 mm) tall, forming the case assembly 102 with a desktop footprint base of a modified square shape measuring approximately 8 inches (203.2 mm) at its widest points. From this base, the case assembly 102 tapers up its height to a top view having a similar shape as the base and measuring approximately 5.5 inches (139.7 mm) at its widest points.

Figure 2:
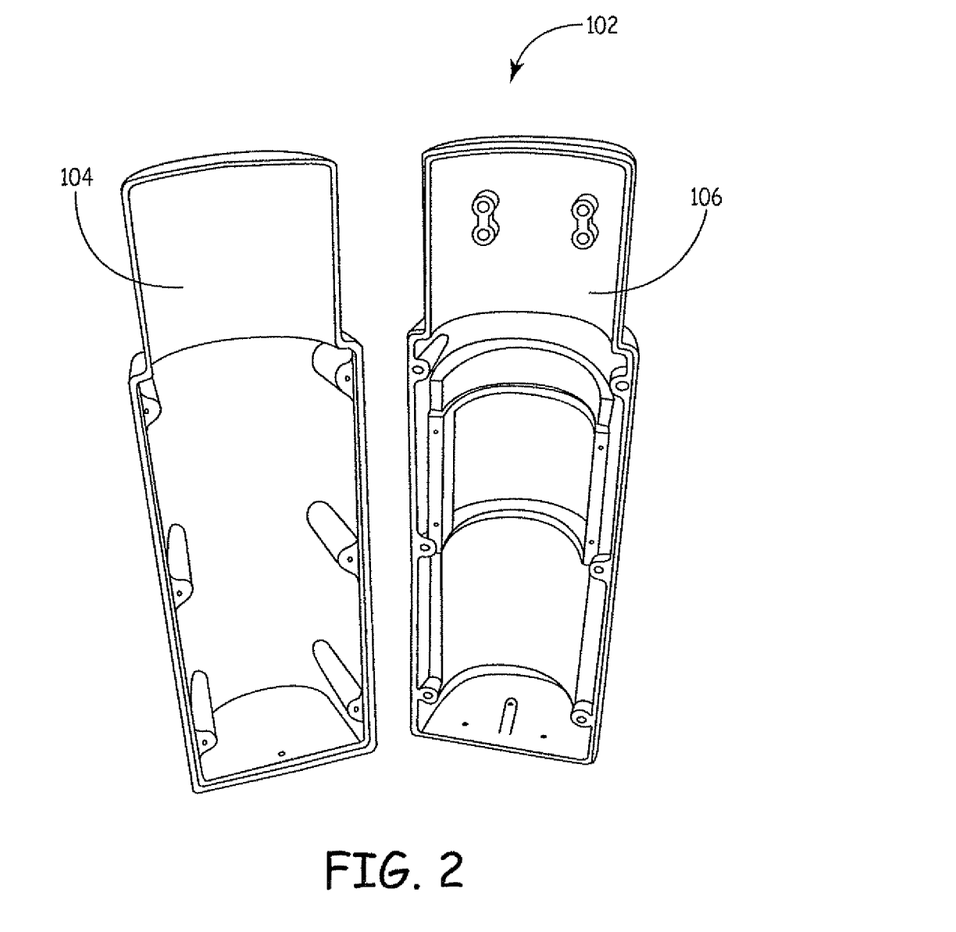
FIG. 2 is a disassembled view of an enclosure forming part of the example ophthalmic lens scanner.
Figure 3:
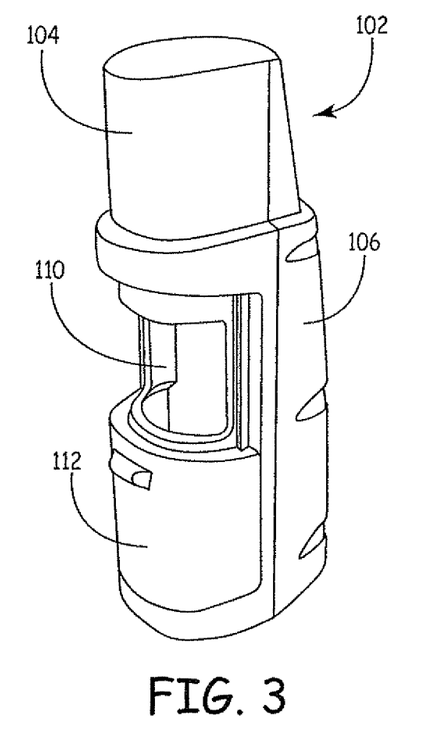
FIG. 3 is an assembled view of the enclosure shown in FIG. 2.
Figure 4:
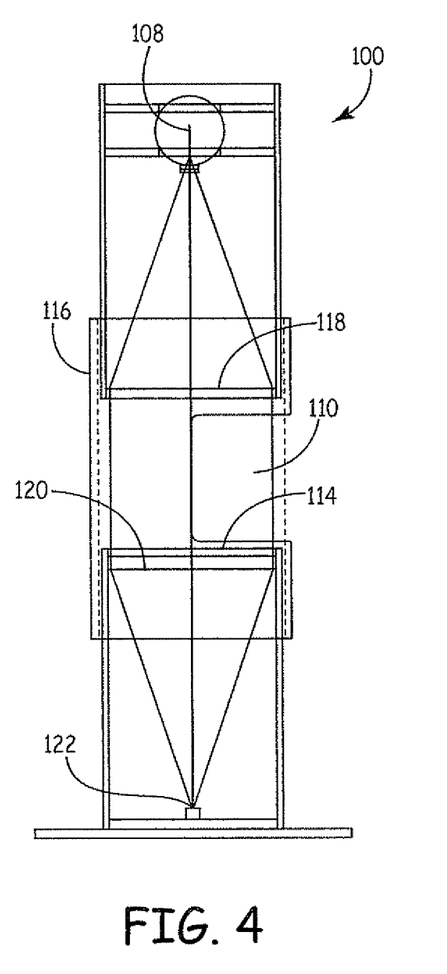
FIG. 4 is a diagram illustrating functional components of the ophthalmic lens scanner of FIG. 1.

FIGS. 2 and 3 illustrate the case assembly 102 in an unassembled state and in an assembled state, respectively. FIG. 4 is a diagram that illustrates functional components of the ophthalmic lens scanner 100. Referring to FIGS. 1 and 4, the front case portion 104 houses a number of hardware components. A camera 108 is mounted near the top of the front case portion 104. The camera 108 may be implemented, for example, as a LIFECAM® VX-6000 camera, commercially available from Microsoft Corporation of Redmond, Wash., USA, and may connect to a computing device (not shown in FIG. 1) via, for example, a Universal Serial Bus (USB) interface. The camera 108 may be controlled by software installed and executing on the computing device, such as OEM software ˆ3ˆ39/XVideo OCX driver software. It will be appreciated by those skilled in the art that other types of cameras can be used to implement the camera 108, and that the software used to control the camera 108 can differ from the software disclosed herein.

The camera 108 is used to capture an image of an ophthalmic prescription lens when the ophthalmic prescription lens is placed in an inspection area 110. A door, shown in FIG. 3 at reference character 112, is operable by sliding between an open position as shown in FIG. 3 and a closed position in which the door 112 covers the inspection area 110. The door 112 depicted in FIG. 3 measures approximately 4.5 inches (114.3 mm) in height and travels its length by means of two externally visible linear rod bearings on each side of the front case. When properly assembled, the door 112 becomes essentially attached to the front ease portion 104 of the ophthalmic lens scanner 100. When the door 112 is positioned in the open position, an ophthalmic prescription lens can be placed in the inspection area 110 on an inspection platform 114. The door 112 can then be moved to the closed position for capturing an image of the ophthalmic prescription lens. In the closed position, the door 112 is held in place by four neodymium disc magnets, each measuring approximately 0.375 inch by 0.25 inch (9.525 mm by 6.35 mm) and being rated at approximately 4.7 pull pounds (2.132 kg). The door 112 is moved vertically using a small protrusion on the front of the door's case and is the only moving part of the ophthalmic lens scanner 100.

The inspection area 110 also incorporates a shield 116 that substantially isolates the ophthalmic prescription lens from ambient light and promotes high contrast between the ophthalmic prescription lens and the background as the image of the ophthalmic prescription lens is captured by the camera 108. The shield 116 is preferably dark or black in color. Two Fresnel lenses 118 and 120 are mounted behind the shield 116 and near the top and bottom, respectively, of the shield 116. The Fresnel lenses 118 and 120 may each have a focal length of approximately 6 inches (152.4 mm) with approximately 125 grooves per inch (4.92 grooves per millimeter) on one surface and may be of an infinite conjugate ratio design. The Fresnel lenses 118 and 120 may be hand cut to a diameter of approximately 4.25 inches (107.95 mm) and are mounted in such a manner that the grooved surfaces of the Fresnel lenses 118 and 120 face one another.

Near the bottom of the ophthalmic lens scanner 100 is a light source 122. The light source 122 may be implemented, for example, as a multi-LED power source lighting board. The lighting board may be circular in shape and contains a number of light emitting diodes (LEDs). For example, the lighting board may be approximately 3.25 inches (82.55 mm) in diameter with one LED mounted at or near the center of the board and 18 LEDs mounted in a substantially circular pattern around the center light. As a particular example, six LEDs may be positioned so as to form a circle having a radius of approximately 0.5 inch (12.7 mm), and twelve LEDs may be positioned so as to form a circle having a radius of approximately 1.1 inches (27.94 mm). It will be appreciated by those skilled in the art that other configurations of LEDs, potentially involving more or fewer LEDs, may be employed. The center LED may be configured to be independently controlled from the other eighteen LEDs.

Referring again to FIG. 1, the rear case portion 106 houses a USB hub 124 and an input/output (I/O) module 126. The USB hub 124 enables the computing device to communicate with multiple peripheral devices using a single USB cable 128 that is connected to the computing device. The USB hub 124 may be implemented, for example, using a model F5U304-WHT USB hub device, commercially available from Belkin International, Inc., of Playa Vista, Calif., USA. This type of hub device supports the USB 2.0 standard and incorporates four ports, allowing the computing device to communicate with up to four peripherals using the USB hub 124. In the ophthalmic lens scanner 100 shown in FIGS. 1-4, the camera 108, I/O module 126, and light source 122 are connected to the USB hub 124, as is the USB cable 128.

The I/O module 126 may be implemented using a model USB-1024LS data acquisition device commercially available from Measurement Computing Corporation of Norton, Mass., USA. This data acquisition device is a 24-bit digital USE-based device that converts signals received from the computing device to voltage signals that control the light source 122. Electrical leads from the power board are connected to specific ports on the I/O module 126 such that the LEDs of the light source 122 are activated in response to commands received from operating software installed and executing on the computing device.

Near the base of the rear case portion 106 is an opening 130 from which the USB cable 128 extends. Additionally, adjacent to the opening 130 is a power jack from which a power cord is inserted to supply electricity required to activate the light source 122.

Figure 5:
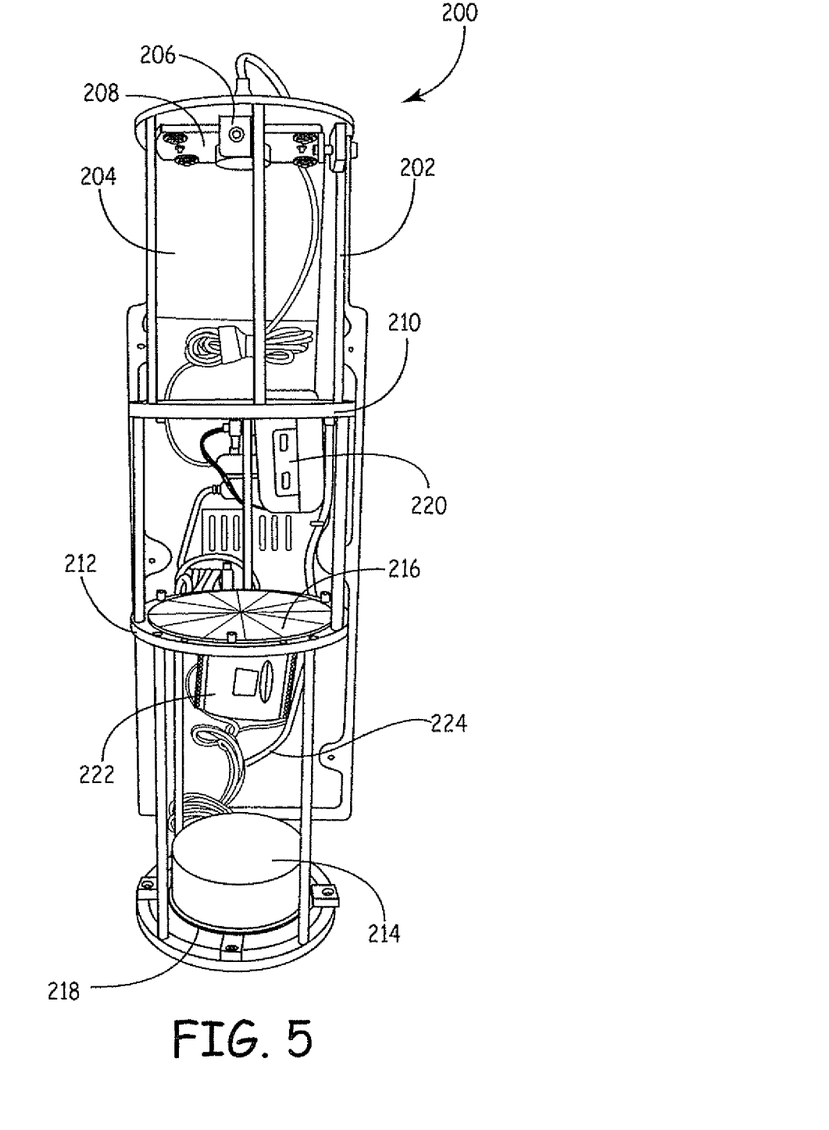
FIG. 5 is a sectional view of an example ophthalmic lens scanner.

FIG. 5 is a sectional view of an example ophthalmic lens scanner 200. The ophthalmic lens scanner 200 includes an enclosure tower 202, which may be formed from stainless steel. The enclosure tower 202 houses a number of hardware components and may be mounted within a case 204. A camera 206 is mounted near the top of the enclosure tower 202. The camera 206 may be implemented, for example, as a LIF-ECAM® VX-6000 camera, commercially available from Microsoft Corporation of Redmond, Wash., USA, and may connect to a computing device (not shown in FIG. 5) via, for example, a Universal Serial Bus (USB) interface. The camera 206 may be controlled by software installed and executing on the computing device, such as OEM software ˆ3ˆ39/XVideo OCX driver software. It will be appreciated by those skilled in the art that other types of cameras can be used to implement the camera 206, and that the software used to control the camera 206 can differ from the software disclosed herein.

The camera 206 is mounted onto a movable platform 208 that can be adjusted horizontally and vertically, or in an "X/Y" coordinate fashion, during assembly to achieve proper alignment of the camera 206, Fresnel lenses 210 and 212, and a light source 214. This movable platform 208 is mounted to an underside of a rigid top plate of the tower enclosure 202 and can be adjusted via two set screws (not shown in FIG. 5), one moving the platform along the "X" coordinate axis and the other moving the platform along the "Y" coordinate axis.

Below the camera 206, e.g., at a distance of approximately 5.433 inches (138 mm) from the camera 206 is the Fresnel lens 210. The Fresnel lens 212 is mounted within the enclosure tower 202, e.g., at a distance of approximately 4.587 inches (116.5 mm) below the Fresnel lens 210. The Fresnel lenses 210 and 212 may each have a focal length of approximately 6 inches (152.4 mm) with approximately 125 grooves per inch (4.92 grooves per millimeter) on one surface and may be of an infinite conjugate ratio design. The Fresnel lenses 210 and 212 may be hand cut to a diameter of approximately 4.25 inches (107.95 mm) and are mounted in such a manner that the grooved surfaces of the Fresnel lenses 210 and 212 face one another.

Mounted on top of, but not touching, the Fresnel lens 212 is an inspection platform 216. The inspection platform 216 may be formed from a flat, clear piece of glass measuring approximately 4.125 inches (104.7 mm) in diameter. In operation, the ophthalmic lens to be inspected is placed on the inspection platform.

Below the Fresnel lens 212, e.g., at a distance of approximately 6.086 inches (154.6 mm) from the Fresnel lens 212, is the light source 214. The light source 214 may be implemented, for example, as a multi-LED power source lighting board. The lighting board may be circular in shape and contains a number of light emitting diodes (LEDs). For example, the lighting board may be approximately 3.25 inches (82.55 mm) in diameter with one LED mounted at or near the center of the board and 18 LEDs mounted in a substantially circular pattern around the center light. As a particular example, six LEDs may be positioned so as to form a circle having a radius of approximately 0.5 inch (12.7 mm), and twelve LEDs may be positioned so as to form a circle having a radius of approximately 1.1 inches (27.94 mm). It will be appreciated by those skilled in the art that other configurations of LEDs, potentially involving more or fewer LEDs, may be employed. The center LED may be configured to be independently controlled from the other eighteen LEDs.

The light source 214 may be enclosed in a cylinder measuring, for example, approximately 3.0 inches by 1.12 inches (76.2 mm by 28.45 mm) for the purposes of maintaining proper lighting diffusion of the LEDs through the Fresnel lenses 210 and 212. The light source 214 is mounted on a movable platform 218 to allow circular movements that may be required to insure proper alignment of the camera 206, Fresnel lenses 210 and 212, and the center LED of the light source 214 during assembly. Once proper alignment of the light source 214 with the other components is obtained, the entire assembly can be clamped into its permanent position.

The ophthalmic lens scanner 200 also includes a USB hub 220 and an input/output (I/O) module 222. The USB hub 220 enables the computing device to communicate with multiple peripheral devices using a single USB cable 224 that is connected to the computing device. The USB hub 220 may be implemented, for example, using a model F5U304-WHT USB hub device, commercially available from Belkin International, Inc., of Playa Vista, Calif., USA. This type of hub device supports the USB 2.0 standard and incorporates four ports, allowing the computing device to communicate with up to four peripherals using the USB hub 220. In the ophthalmic lens scanner 200 shown in FIG. 5, the camera 206, I/O module 222, and light source 214 are connected to the USB hub 220, as is the USB cable 224.

The I/O module 222 may be implemented using a model USB-1024LS data acquisition device commercially available from Measurement Computing Corporation of Norton, Mass., USA. This data acquisition device is a 24-bit digital USB-based device that converts signals received from the computing device to voltage signals that control the light source 214. Electrical leads from the power board are connected to specific ports on the 110 module 222 such that the LEDs of the light source 214 are activated in response to commands received from operating software installed and executing on the computing device.

Figure 6:
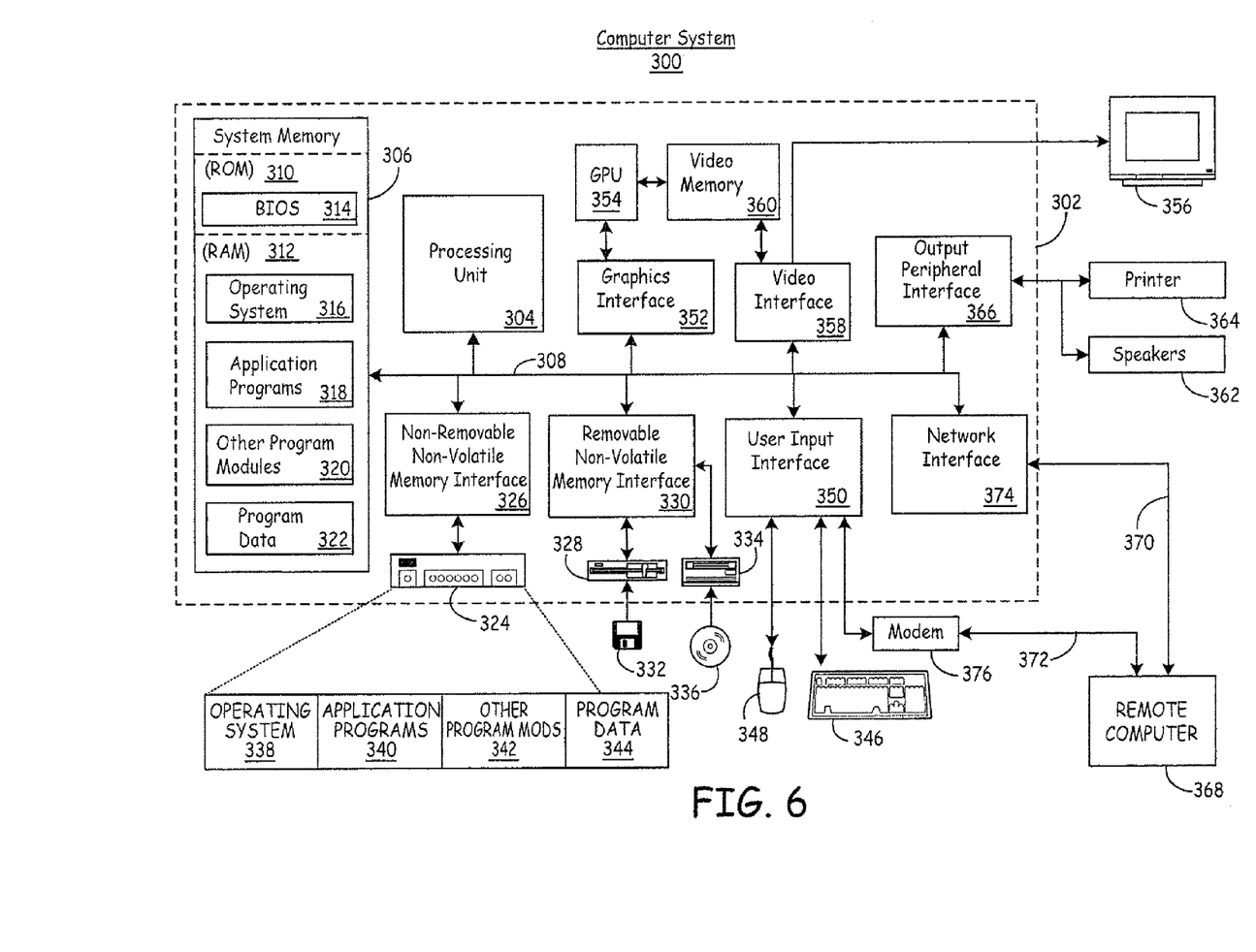
FIG. 6 is an example computer system for use in operating the ophthalmic lens scanners of FIGS. 1-5.

FIG. 6 is a block diagram illustrating a computer system 300 that can be programmed to operate the ophthalmic lens scanner 100 or the ophthalmic lens scanner 200. The computer system 300 is only one example of a suitable computing environment and is not intended to suggest any limitation as to the scope of use or functionality of the subject matter described herein. The computer system 300 should not be construed as having any dependency or requirement relating to any one component or combination of components shown in FIG. 6.

The computer system 300 includes a general computing device, such as a computer 302. Components of the computer 302 may include, without limitation, a processing unit 304, a system memory 306, and a system bus 308 that communicates data between the system memory 306, the processing unit 304, and other components of the computer 302. The system bus 308 may incorporate any of a variety of bus structures including a memory bus or memory controller, a peripheral bus, and a local bus using any of a variety of bus architectures. These architectures include, without limitation, Industry Standard Architecture (ISA) bus, Enhanced ISA (EISA) bus, Micro Channel Architecture (MCA) bus, Video Electronics Standards Association (VESA) local bus, and Peripheral Component Interconnect (PCI) bus, also known as Mezzanine bus.

The computer 302 also is typically configured to operate with one or more types of processor readable media or computer readable media, collectively referred to herein as "processor readable media." Processor readable media includes any available media that can be accessed by the computer 302 and includes both volatile and non-volatile media, and removable and non-removable media. By way of example, and not limitation, processor readable media may include storage media and communication media. Storage media includes both volatile and non-volatile, and removable and non-removable media implemented in any method or technology for storage of information such as processor-readable instructions, data structures, program modules, or other data. Storage media includes, but is not limited to, RAM, ROM, EEPROM, flash memory or other memory technology, CD-ROM, digital versatile discs (DVDs) or other optical disc storage, magnetic cassettes, magnetic tape, magnetic disk storage or other magnetic storage devices, or any other medium that can be used to store the desired information and that can be accessed by the computer 302. Communication media typically embodies processor-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also intended to be included within the scope of processor readable media.

The system memory 306 includes computer storage media in the form of volatile memory, non-volatile memory, or both, such as read only memory (ROM) 310 and random access memory (RAM) 312. A basic input/output system (BIOS) 314 contains the basic routines that facilitate the transfer of information between components of the computer 302, for example, during start-up. The BIOS 314 is typically stored in ROM 310. RAM 312 typically includes data, such as program modules, that are immediately accessible to or presently operated on by the processing unit 304. By way of example, and not limitation, FIG. 6 depicts an operating system 316, application programs 318, other program modules 320, and program data 322 as being stored in RAM 312.

The computer 302 may also include other removable or non-removable, volatile or non-volatile computer storage media. By way of example, and not limitation, FIG. 6 illustrates a hard disk drive 324 that communicates with the system bus 308 via a non-removable memory interface 326 and that reads from or writes to a non-removable, non-volatile magnetic medium, a magnetic disk drive 328 that communicates with the system bus 308 via a removable memory interface 330 and that reads from or writes to a removable, non-volatile magnetic disk 332, and an optical disk drive 334 that communicates with the system bus 308 via the interface 330 and that reads from or writes to a removable, non-volatile optical disk 336, such as a CD-RW, a DVD-RW, or another optical medium. Other computer storage media that can be used in connection with the computer system 300 include, but are not limited to, flash memory, solid state RAM, solid state ROM, magnetic tape cassettes, digital video tape, etc.

The devices and their associated computer storage media disclosed above and illustrated in FIG. 6 provide storage of computer readable instructions, data structures, program modules, and other data that are used by the computer 302. In FIG. 6, for example, the hard disk drive 324 is illustrated as storing an operating system 338, application programs 340, other program modules 342, and program data 344. These components can be the same as or different from the operating system 316, the application programs 318, the other program modules 320, and the program data 322 that are stored in the RAM 312. In any event, the components stored by the hard disk drive 324 are different copies from the components stored by the RAM 312.

A user may enter commands and information into the computer 302 using input devices, such as a keyboard 346 and a pointing device 348, such as a mouse, trackball, or touch pad. Other input devices, which are not shown in FIG. 6, may include, for example, a microphone, a scanner, a camera, or the like. These and other input devices may be connected to the processing unit 304 via a user input interface 350 that is connected to the system bus 308. Alternatively, input devices can be connected to the processing unit 304 via other interface and bus structures, such as a parallel port or a universal serial bus (USB).

A graphics interface 352 can also be connected to the system bus 308. One or more graphics processing units (GPUs) 354 may communicate with the graphics interface 352. A monitor 356 or other type of display device is also connected to the system bus 308 via an interface, such as a video interface 358, which may in turn communicate with video memory 360. In addition to the monitor 356, the computer system 300 may also include other peripheral output devices, such as speakers 362 and a printer 364, which may be connected to the computer 302 through an output peripheral interface 366.

The computer 302 may operate in a networked or distributed computing environment using logical connections to one or more remote computers, such as a remote computer 368. The remote computer 368 may be a personal computer, a server, a router, a network PC, a peer device, or another common network node, and may include many or all of the components disclosed above relative to the computer 302. The logical connections depicted in FIG. 6 include a local area network ILAN) 370 and a wide area network (WAN) 372, but may also include other networks and buses., Such networking environments are common in homes, offices, enterprise-wide computer networks, intranets, and the Internet.

When the computer 302 is used in a LAN networking environment, it may be connected to the LAN 370 through a wired or wireless network interface or adapter 374. When used in a WAN networking environment, the computer 302 may include a modem 376 or other means for establishing communications over the WAN 372, such as the Internet. The modem 376 may be internal or external to the computer 302 and may be connected to the system bus 308 via the user input interface 350 or another appropriate component. The modem 376 may be a cable or other broadband modem, a dial-up modem, a wireless modem, or any other suitable communication device. In a networked or distributed computing environment, program modules depicted as being stored in the computer 302 may be stored in a remote memory storage device associated with the remote computer 368. For example, remote application programs may be stored in such a remote memory storage device. It will be appreciated that the network connections shown in FIG. 6 are exemplary and that other means of establishing a communication link between the computer 302 and the remote computer 368 may be used.

The computer 302 executes a number of software components to operate the ophthalmic lens scanner 100 or the ophthalmic lens scanner 200. For example, to operate the ophthalmic lens scanner 100, the computer 302 uses driver software for the camera 108 that is typically supplied on an optical medium packaged with the camera 108. The computer 302 also uses driver software for the I/O module 126 that is typically supplied on an optical medium packaged with the I/O module 126. It will be appreciated by those skilled in the art that the driver software for the camera 108, the I/O module 126, or both can also be downloaded from websites operated by the respective manufacturers of the camera 108 and the I/O module 126.

In addition to this driver software, the computer 302 also executes operating software that performs calculations relevant to the prescription lens geometry captured via the camera 108 or the camera 206 and the lens image as projected through the Fresnel lenses 118 and 120 or the Fresnel lenses 210 and 212. The operating software may be installed using optical media, such as the optical disk 336, or using a network connection to download the operating software from a server. The operating software is available from Practical Engineering, LLC, of Minneapolis, Minn., USA.

When all of the software is successfully downloaded and activated onto the computer 302 and the ophthalmic lens scanner 100 or the ophthalmic lens scanner 200 is plugged into a conventional wall electrical outlet (e.g., 110 V in the United States of America), a computer screen icon will appear on the monitor 356. When the user selects the icon using, for example, the pointing device 348, the operating software is initiated, and a user interface appears on the monitor 356.

Figure 7:
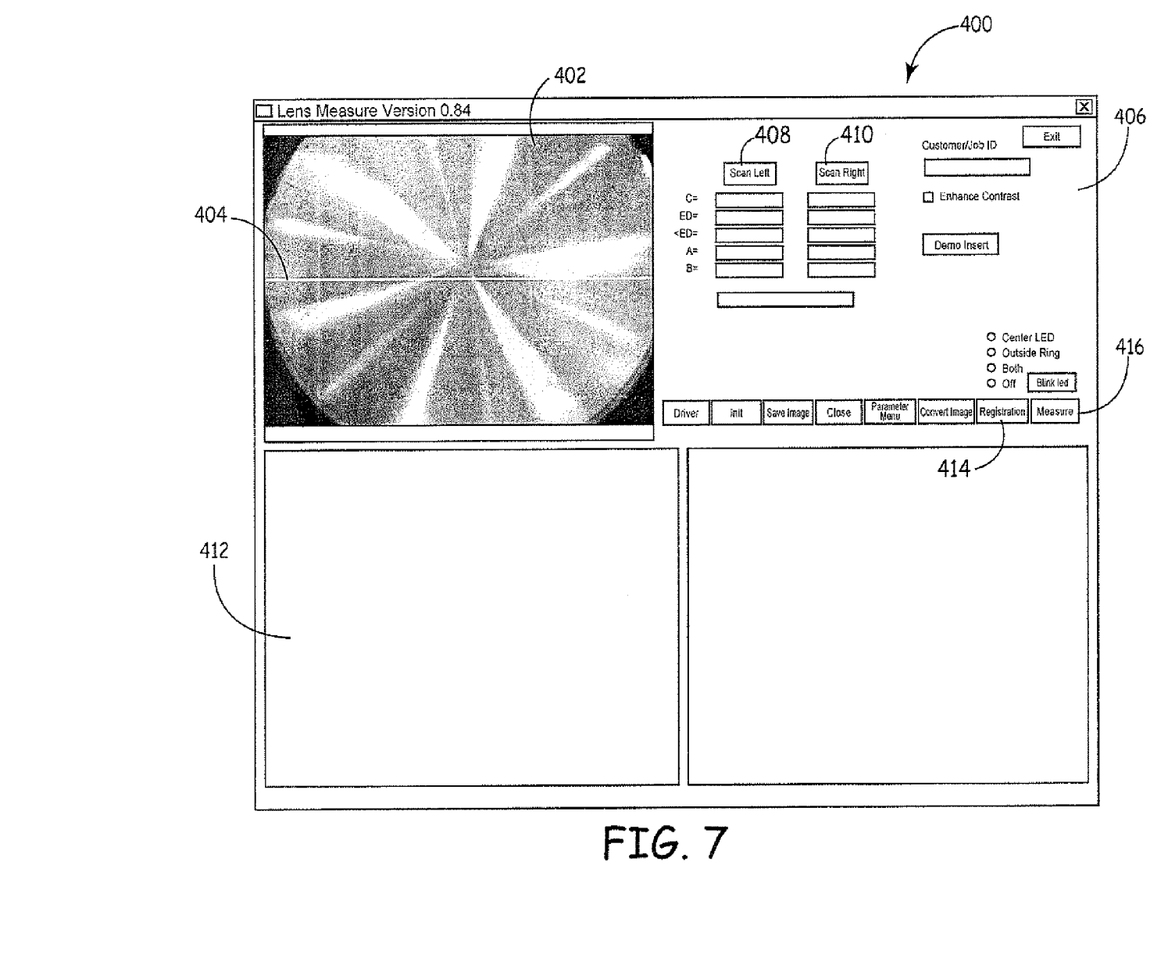
FIG. 7 is an example graphical user interface (GUI) for interfacing with the ophthalmic lens scanner.

FIG. 7 illustrates an example graphical user interface (GUI) 400 that may be presented on the monitor 356. The GUI 400 contains a number of functional areas. An area 402 at the upper left portion of the GUI 400 displays an image of the Fresnel lens 120 or the Fresnel lens 212. When an ophthalmic lens is placed in the ophthalmic lens scanner 100 or the ophthalmic lens scanner 200, the user can see the ophthalmic lens and align it along a white horizontal line that runs across a middle portion 404 of the image of the Fresnel lens.

An area 406 at the upper right portion of the GUI 400 displays command buttons for calibrating the ophthalmic lens scanner 100 or the ophthalmic lens scanner 200 and command buttons that initiate algorithms for determining prescription lens geometry. For example, the area 406 displays buttons 408 and 410 that, when actuated, cause the ophthalmic lens scanner to scan a left eye lens or a right eye lens, respectively. An area 412 at the bottom portion of the GUI 400 allows the user to see a scaled image of the prescription lens that is produced by the operating software when the user actuates the button 408 or the button 410.

Figure 8:
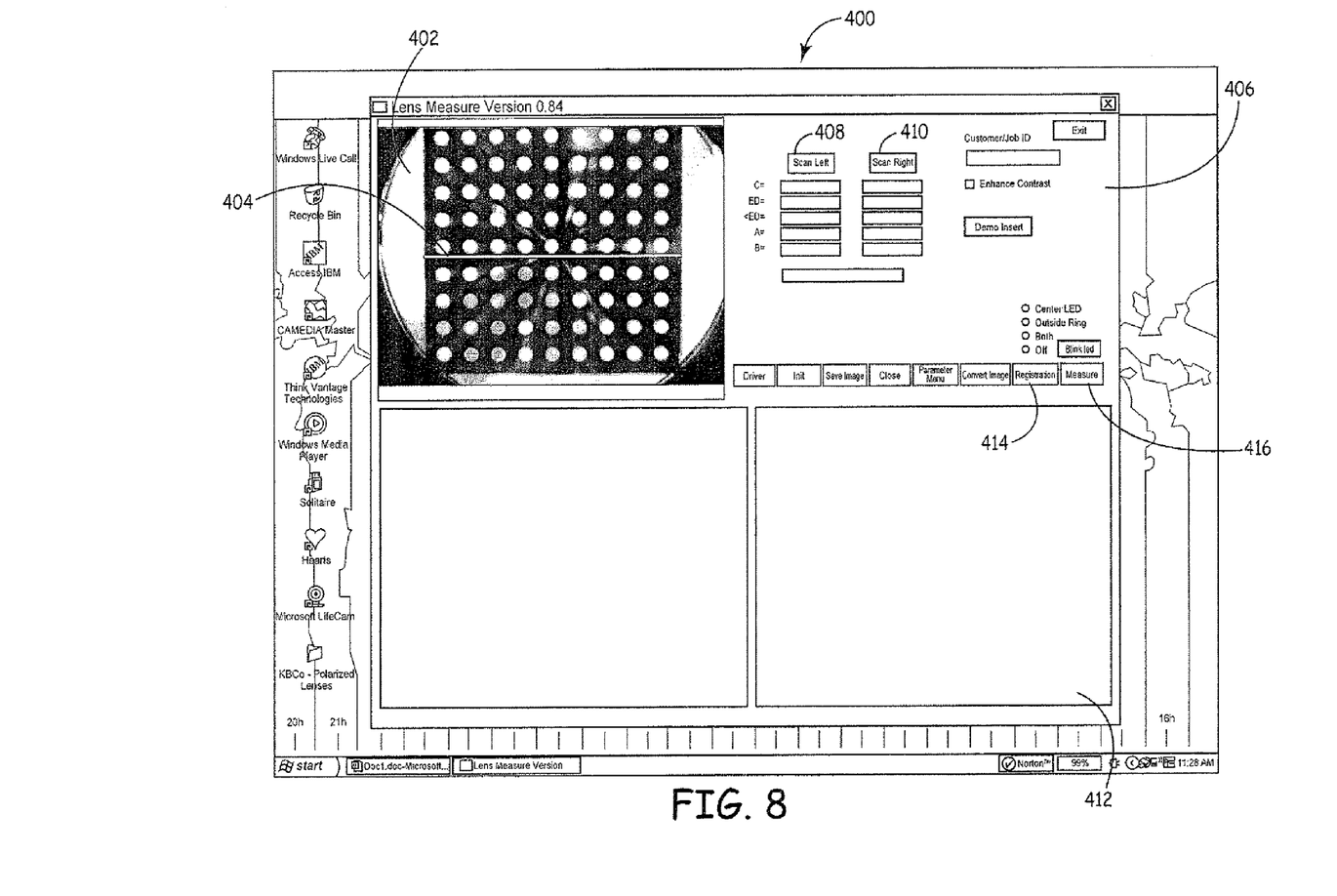
FIG. 8 is another example graphical user interface for interfacing with the ophthalmic lens scanner.

To prepare the ophthalmic lens scanner 100 or the ophthalmic lens scanner 200 for operation, a registration plate is placed on the lower Fresnel lens 120 or the lower Fresnel lens 212 to ensure that the image of the registration plate is aligned, as shown in FIG. 8. When the registration plate is in place, the operator actuates a Registration command button 414 in the area 406 of the GUI 400. When the Registration command button 414 is actuated, the operating software causes the center LED in the lighting source to emit light, which passes through holes in the registration plate and through the upper Fresnel lens 118 or the upper Fresnel lens 210 and onto the lens of the camera 108 or the camera 206. This process verifies to the operating software that all of the critical internal components—the camera, the Fresnel lenses, and the light source—are all in direct line-of-light and optical axis alignment. Once optical axis alignment is achieved, the algorithms used in the mathematical calculations are essentially activated and can therefore produce the desired prescription lens geometry captured via the interactions of the camera, Fresnel lenses, and the lighting source.

Figure 9:
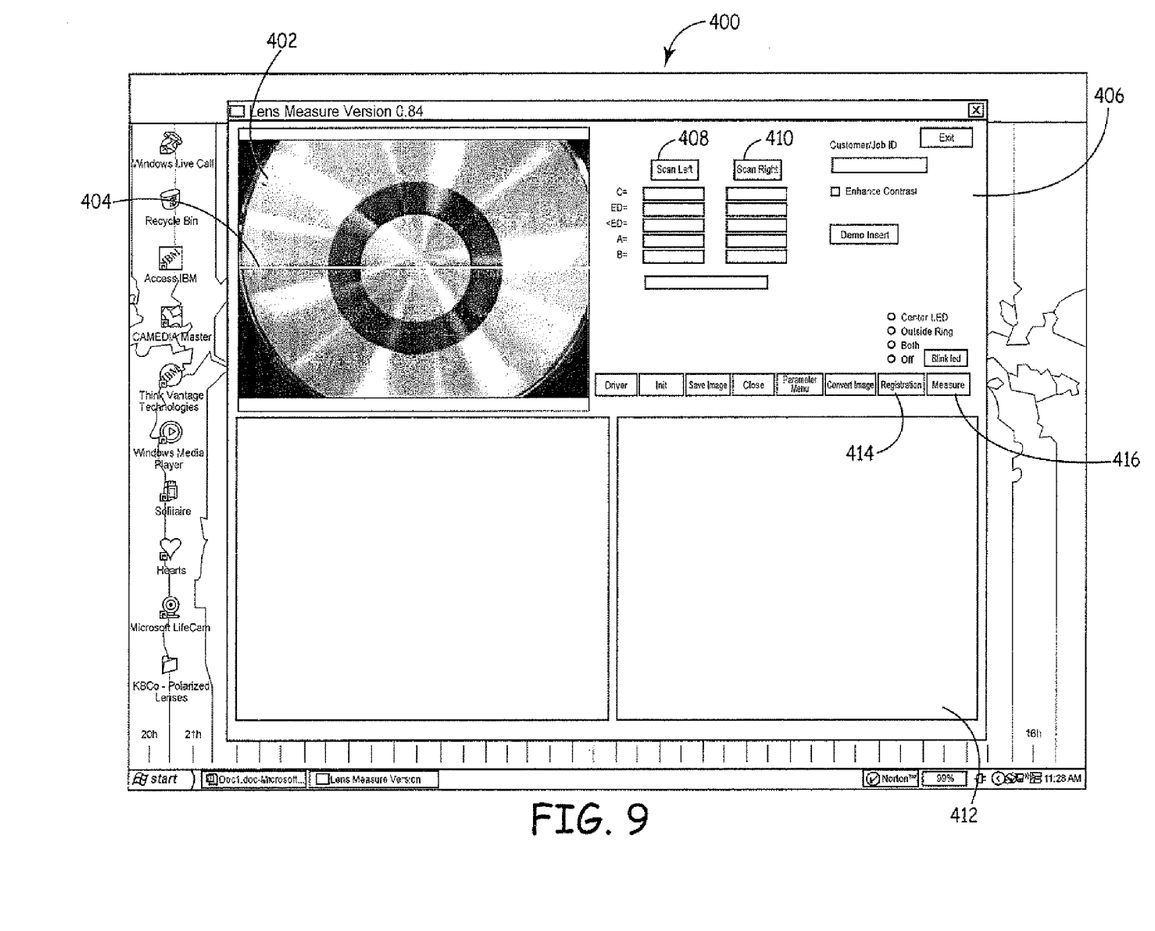
FIG. 9 is still another example graphical user interface for interfacing with the ophthalmic lens scanner.

Another procedure that is performed by the user in preparing the ophthalmic lens scanner to determine a prescription lens geometry involves inserting a calibration object, such as a round calibration disc having a diameter of, for example, approximately 2 inches (50.8 mm) over the lower Fresnel lens 120 or the lower Fresnel lens 212, similarly to the registration plate discussed above, FIG. 9 illustrates the calibration disc in place, as depicted in the area 402 of the GUI 400.

With the calibration disc in place, the user actuates a Measure command button 416, which is displayed in the area 406 of the GUI 400. When the Measure command button 416 is actuated, the operating software captures the digital camera image via the light source 122 or the light source 214 through the Fresnel lenses. The operating software then verifies that all of the radii around the perimeter of the disc are of the same length as that described in the operating software as to what in reality is a known correct radius of, for example, an approximate 2 inch (50.8 mm) diameter circle. When this process is successfully performed by the user and verified by the software, accuracy of the geometric shape and definitive measurements of prescription lenses to be scanned may be ensured.

The operating software for the ophthalmic lens scanner in conjunction with the driver software of the camera and the I/O module software provide the necessary commands for the digital camera to capture images of ophthalmic lenses that are placed on the inspection plate. The operating software firsts add one pixel to each of the digital points initially captured around the prescription lens image. The operating software then subtracts one pixel point from the digital points initially captured and then uses an algorithm to derive and display on the monitor 356 the completed shape of the prescription lens, the actual circumference, or distance around the perimeter of the prescription lens, as well as the horizontal and vertical measurements of the prescription lens and the length of the two most distant points of the prescription lens. In this way, the geometry of the prescription lens is accurately determined.

As demonstrated by the foregoing discussion, certain advantages may be realized. For instance, a retail ophthalmic dispenser can scan a patient's old lenses and transmit accurate size, shape, and dimensional geometry to the laboratory, for example, via the Internet. When the laboratory receives the lens specifications, work can immediately begin due to the accuracy of the data provided. As a result, delivery of new prescription lenses to the patient can be completed at least 2-3 working days more quickly compared with conventional techniques. In addition, patients are not required to surrender their frames to the retail ophthalmic dispenser for shipment to the fabricating laboratory.

It will be understood by those who practice the embodiments described herein and those skilled in the art that various modifications and improvements may be made without departing from the spirit and scope of the disclosed embodiments. The scope of protection afforded is to be determined solely by the claims and by the breadth of interpretation allowed by law.

Although the present invention has been described with reference to preferred embodiments, workers skilled in the art will recognize that changes may be made in form and detail without departing from the spirit and scope of the invention.

What is claimed is:

1. An ophthalmic lens scanner comprising:
   an inspection platform configured to receive an ophthalmic lens thereon;
   a camera spaced apart from the inspection platform and arranged to, in response to an activation signal, capture an image of the ophthalmic lens;
   a light source spaced apart from the inspection platform and configured to emit light when the camera is activated to capture an image of the ophthalmic lens, the inspection platform located between the camera and the light source;
   a first Fresnel lens located between the inspection platform and the camera; and
   a second Fresnel lens located between the inspection platform and the light source wherein the first and second Fresnel lenses are substantially parallel in orientation and wherein a grooved surface of each of the first and second lenses face one another.

2. The ophthalmic lens scanner of claim 1, further comprising a housing enclosing the inspection platform, the camera, the light source, the first Fresnel lens, and the second Fresnel lens.

3. The ophthalmic lens scanner of claim 2, wherein the housing comprises a door operable between an open position for receiving the ophthalmic lens and a closed position for capturing the image of the ophthalmic lens.

4. The ophthalmic lens scanner of claim 3, further comprising a shield arranged proximate the inspection platform to substantially isolate the ophthalmic lens from ambient light when the camera captures the image of the ophthalmic lens.

5. The ophthalmic lens scanner of claim 2, further comprising a tower enclosure located within the housing, wherein the inspection platform, the camera, the light source, the first Fresnel lens, and the second Fresnel lens are mounted to the tower enclosure.

6. The ophthalmic lens scanner of claim 1, wherein the light source comprises a plurality of light emitting diodes (LEDs), and further comprising an input/output (I/O) module configured to activate the LEDs in response to a command received in the I/O module.

7. The ophthalmic lens scanner of claim 1, further comprising a Universal Serial Bus (USB) hub, wherein the camera and the light source are electrically connected to the USB hub.

8. An ophthalmic lens scanner system comprising:
   a computing device; and
   an ophthalmic lens scanner in electrical communication with the computing device, the ophthalmic lens scanner comprising:
   an inspection platform configured to receive an ophthalmic lens thereon;
   a camera spaced apart from the inspection platform and arranged to, in response to an activation signal from the computing device, capture an image of the ophthalmic lens;
   a light source spaced apart from the inspection platform and configured to emit light when the camera is activated to capture an image of the ophthalmic lens, the inspection platform located between the camera and the light source;
   a first Fresnel lens located between the inspection platform and the camera; and
   a second Fresnel lens located between the inspection platform and the light source wherein the first and second Fresnel lenses are substantially parallel in orientation and wherein a grooved surface of each of the first and second lenses face one another.

9. The ophthalmic lens scanner system of claim 8, further comprising a housing enclosing the inspection platform, the camera, the light source, the first Fresnel lens, and the second Fresnel lens.

10. The ophthalmic lens scanner system of claim 9, wherein the housing comprises a door operable between an open position for receiving the ophthalmic lens and a closed position for capturing the image of the ophthalmic lens.

11. The ophthalmic lens scanner system of claim 10, further comprising a shield arranged proximate the inspection platform to substantially isolate the ophthalmic lens from ambient light when the camera captures the image of the ophthalmic lens.

12. The ophthalmic lens scanner system of claim 9, further comprising a tower enclosure located within the housing, wherein the inspection platform, the camera, the light source, the first Fresnel lens, and the second Fresnel lens are mounted to the tower enclosure.

13. The ophthalmic lens scanner system of claim 8, wherein the light source comprises a plurality of light emitting diodes (LEDs), and further comprising an input/output (I/O) module configured to activate the LEDs in response to a command received in the I/O module from the computing device.

14. The ophthalmic lens scanner system of claim 8, further comprising a Universal Serial Bus (USB) hub, wherein the camera, the light source, and the computing device are electrically connected to the USB hub.

15. An ophthalmic lens scanner system comprising:
   a computing device;
   an ophthalmic lens scanner in electrical communication with the computing device, the ophthalmic lens scanner comprising:
   a housing defining an inspection area for receiving an ophthalmic lens;
   a camera located at a first end portion of the housing and controlled by the computing device to capture an image of the ophthalmic lens;
   a light source located at a second end portion of the housing and controlled by the computing device to emit light to illuminate the ophthalmic lens;
   a first Fresnel lens located between the inspection area and the camera; and
   a second Fresnel lens located between the inspection area and the light source wherein the first and second Fresnel lenses are substantially parallel in orientation and wherein a grooved surface of each of the first and second lenses face one another; and
   a display device in electrical communication with the computing device and configured to display a graphical user interface (GUI) for controlling the ophthalmic lens scanner and for viewing the image of the ophthalmic lens captured by the camera.

16. The ophthalmic lens scanner system of claim 15, wherein the housing comprises a door operable between an open position for receiving the ophthalmic lens and a closed position for capturing the image of the ophthalmic lens.

17. The ophthalmic lens scanner system of claim 15, wherein the ophthalmic lens scanner further comprises a shield arranged proximate the inspection area to substantially isolate the ophthalmic lens from ambient light when the camera captures the image of the ophthalmic lens.

18. The ophthalmic lens scanner system of claim 15, further comprising:
   an input/output (I/O) module configured to activate the light source in response to a command received in the I/O module from the computing device; and
   a Universal Serial Bus (USB) hub electrically connected to the camera, the I/O module, and the computing device for controlling the camera and the light source.

19. The ophthalmic lens scanner system of claim 15, wherein the computing device is configured to calibrate the ophthalmic lens scanner by using a registration plate to verify that the camera, the light source, the first Fresnel lens, and the second Fresnel lens are in optical axis alignment.

20. The ophthalmic lens scanner system of claim 15, wherein the computing device is configured to calibrate the ophthalmic lens scanner by causing the camera to capture an image of a calibration object having a known geometry and comparing the image captured by the camera to the known geometry.

* * * * *